United States Patent [19]

Watanabe et al.

[11] Patent Number: 5,178,697
[45] Date of Patent: Jan. 12, 1993

[54] PNEUMATIC TIRE WITH TREAD DEFINED BY SINGULARLY BENT TRANSVERSE GROOVES

[75] Inventors: Susumu Watanabe, Hiratsuka; Tsuneo Morikawa, Hadano; Izumi Kuramochi, Tokyo, all of Japan

[73] Assignee: The Yokohama Rubber Co., Ltd., Tokyo, Japan

[21] Appl. No.: 690,756

[22] Filed: Apr. 24, 1991

[51] Int. Cl.$^5$ .................................. B60C 11/11
[52] U.S. Cl. .................. 152/209 R; D12/146
[58] Field of Search ......... 152/209 R, 209 A, 209 D; D12/146–148

[56] References Cited

U.S. PATENT DOCUMENTS

| | | | |
|---|---|---|---|
| D. 291,073 | 7/1987 | Guermandi | D12/146 |
| D. 313,213 | 12/1990 | Hamada et al. | D12/147 |
| D. 314,169 | 1/1991 | Covert et al. | D12/147 |

FOREIGN PATENT DOCUMENTS

| | | | |
|---|---|---|---|
| 0090703 | 7/1981 | Japan | 152/209 R |
| 2175304 | 7/1990 | Japan | 152/209 R |
| 2189205 | 7/1990 | Japan | 152/209 R |

Primary Examiner—Michael W. Ball
Assistant Examiner—Nancy T. Krawczyk
Attorney, Agent, or Firm—Nikaido, Marmelstein, Murray & Oram

[57] ABSTRACT

A pneumatic tire wherein a plurality of main grooves are provided in a tread of the tire in the circumferential direction thereof with a plurality of sub-grooves connecting these main grooves with each other being provided in the width-wise direction of the tire, wherein each of these sub-grooves is bent in a convex shape facing in the same direction relative to the circumferential direction of the tire, and wherein bending points of the sub-grooves are distributed within those areas in the tread of the tire which extend, respectively, from a tire equator line toward opposite sides of the tire in the width-wise direction thereof over a distance equal to 5 to 25% of the tread ground-contacting width in such a manner that the number of the bending points become substantially equal on either side of the equator line.

6 Claims, 3 Drawing Sheets

PNEUMATIC TIRE WITH TREAD DEFINED BY SINGULARLY BENT TRANSVERSE GROOVES

BACKGROUND OF THE INVENTION

The present invention relates to a pneumatic tire in which the drain properties for wet-road running is improved.

Generally, when running on a wet road, the friction coefficient between the tires of an automobile and the road surface is lowered. In particular, in a case where the depth of water on the surface of a wet road is deep, or in a case where an automobile is run at a high running speed on a wet road, a layer of water is produced between the tires of the automobile and the surface of the road while running, and the friction coefficient is remarkably lowered. A state like this is called "hydroplaning". When a hydroplaning takes place, an automobile fitted with tires goes out of control, and this sometimes leads to an accident. In order to prevent the occurrence of hydroplaning like this, a tire must have good drain properties.

Conventionally, in order to improve the drain properties of a tire, a tire is adopted in which, in addition to a plurality of main grooves disposed in the circumferential direction of the tire, a plurality of sub-grooves that are bent in a V-shape in the rotational direction of the tire are also disposed in the tread surface of the tire substantially in parallel with one another with the bending points (the apexes of the V shapes) of these sub-grooves being disposed substantially centrally in the width-wise direction of the tire (the tire equator line A). However, with a so-called tread pattern having a directional property like this, the drain properties for straight running can be improved, but the tread pattern has a drawback that the drain properties at the time of turning is lowered due to the deviation of the ground-contacting center towards the width-wise direction of the tire.

In order to cope with this, a tread pattern having a directional property is proposed in which in consideration of the drain properties for turning, the bending points of sub-grooves are deviated in the width-wise direction from the equator line of the tire toward one (the outer side of the automobile) of the sides thereof. However, with a tread pattern like this, tread patterns of right tires must be different from those of left ones of an automobile, respectively, and molds of two types are required to produce tires, which is disadvantageous in the production of tires.

SUMMARY OF THE INVENTION

An object of the present invention is to provide a pneumatic tire having a tread pattern with a directional property that can be produced using a mold of one type and which can improve the drain properties for turning without sacrificing the drain properties for straight running on a wet road even when a tire with the tread pattern is used on either side of an automobile.

In order to accomplish this object, the present invention provides a pneumatic tire which is characterized in that a plurality of main grooves are provided in the tread of the tire so as to circumferentially fully extend around the tire with a plurality of sub-grooves connecting these main grooves with each other being also provided in the width-wise direction of the tire, that each of these sub-grooves is bent in a convex shape in the same direction relative to the circumferential direction of the tire, and that the bending points of the sub-grooves are distributed within those areas of the tread of the tire which extend, respectively, from a tire equator line toward opposite sides of the tire in the width-wise direction thereof over a distance equal to 5 to 25% of the tread ground-contacting width in such a manner that the number of the bending points become substantially equal on either side of the equator line.

DETAILED DESCRIPTION OF THE PREFERRED EMBODIMENTS

Figure 1:
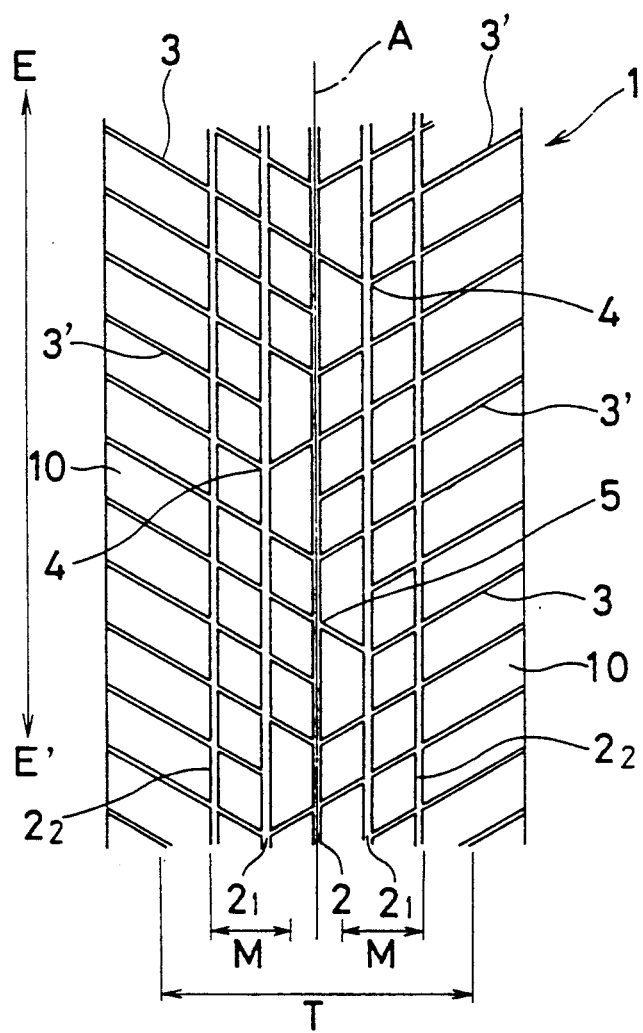
FIGS. 1 and 2 are plan views partly showing examples of tread patterns for a pneumatic tire according to the present invention, respectively.

In FIG. 1, a plurality of main grooves 2, $2_1$, $2_2$ (five grooves in this embodiment) fully extending around a tire in the circumferential direction EE' thereof are provided in the tread 1 of the tire in an annular fashion, and a plurality of sub-grooves 3 connecting these main grooves with each other are provided extending in the width-wise direction of the tire from one shoulder portion 10 to the other shoulder portion 10. In other words, a tread pattern comprising the main grooves 2, $2_1$, $2_2$, and the sub-grooves 3 is formed in the tread 1 of the tire. The respective sub-grooves 3 are bent in a convex shape (substantially in a V-shape in FIG. 1) so as to face in the same direction with respect to the circumferential direction EE' of the tire, and are put substantially in parallel with each other. In addition to the above sub-grooves 3 that are bent substantially in a V-shape, linear sub-grooves 3' having a proper length may be interposed between the adjacent sub-grooves 3, 3 with a view to adjusting a ratio of the groove area in the tread 1 of the tire.

Bending points 4 of the sub-grooves 3 are disposed within two areas M which extend, respectively, from a tire equator line A toward opposite sides of the tire in the width-wise direction thereof over a distance equal to 5 to 25% of the tread ground-contacting width T, and are distributed such that the number of the bending points become substantially equal on either side of the tire equator line A.

Figure 2:
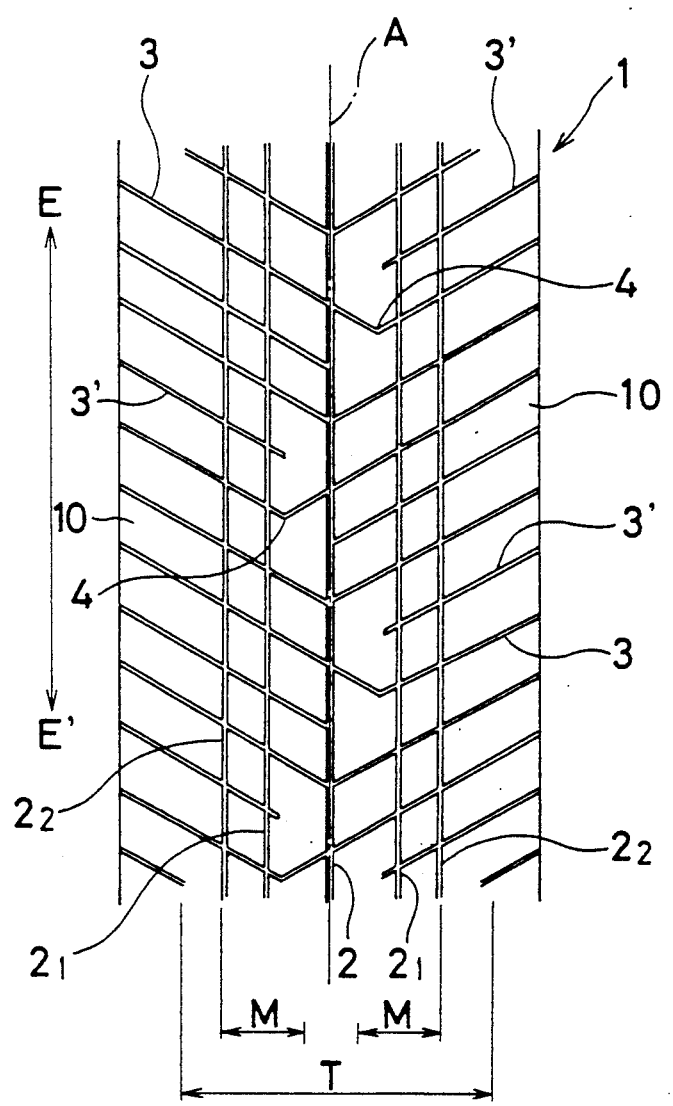

The bending points 4 of the sub-grooves 3 to be disposed within the area M may be, as shown in Fig. 2, situated near the main grooves $2_1$, $2_1$ that are disposed on the left- and right-hand sides of the tire equator line A, or may be situated on the main grooves $2_1$, $2_1$ as shown in FIG. 1. However, the bending points may preferably be situated as shown in FIG. 1, whereby water gathering at the bending points 4 is allowed to flow into the main grooves $2_1$, $2_1$, thereby making it possible to further improve the drain properties of the tire. In any case, in a case where one or more main grooves are provided within the respective areas M, it is preferable to place the bending points 4 on anyone of the main grooves so provided within the respective areas M.

In FIG. 2, another example of the tread pattern to be formed in the tread of a pneumatic tire according to the present invention is partly illustrated. In this example, the bending points 4 are situated near the main grooves $2_1$, $2_1$. Due to this, when compared with a tire having the tread pattern shown in FIG. 1, the turning performance on a wet road is slightly lowered with a tire having the tread pattern of FIG. 2, but the effectiveness intended by the present invention is still retained.

In order to further improve the drain properties, as shown in FIGS. 1 and 2, some of the bending points 4 of the sub-grooves 3 may be placed on the main groove 2 on the tire equator line A. Some of the bending points 4 are placed on the main groove 2 on the tire equator line A like this because of possible limitations imposed in forming the tread patterns. In any case, it is preferable to place substantially a half or more of the total bending points 4 of the sub-grooves 3 of the tire within the above-mentioned left and right areas M with the remaining bending points 4 being situated on the main groove 2 on the tire equator line A.

In addition, in order to further uniformalize the drain properties, it is preferable to dispose the bending points 4 of the sub-grooves 3 along the circumferential direction of the tire alternately on the left- and right-hand sides of the tire equator line A.

In this embodiment, the reason why the area M is determined to fall within a range from 5 to 25% of the tread ground-contacting width T is to improve the drain properties for turning. In other words, in a case where the area M is within 5% of the tread ground-contacting width T, the whole bending points 4 are located near the tire equator line A, and this lowers the drain properties for turning, while with the area M exceeding the 25%, the bending points 4 become too close to the sholder portions, this time lowering the drain properties for straight running. In addition, the reason why the bending points 4 of the sub-grooves 3 are distributed so as to be substantially equal in the number on either side of the tire equator line is not only to uniformalize the drain properties even when a tire having the tread pattern is interchangeably used either on the left- or right-hand side of an automobile but also to use a mold of only one type in producing tires.

Furthermore, although the bending points 4 are formed into substantially a V-shape when viewed from thereabove in FIGS. 1 and 2, the distal end of the bending point may be curvedly shaped instead of this V-shape. In addition, the angle of inclination of the sub-grooves 3 relative to the circumferential direction EE' of the tire is not limited to those in FIGS. 1 and 2.

The following is a description of an example.

EXAMPLE

The following five kinds of tires each having a common tire size of 205/60 R15 were prepared, and the hydroplaning performance for straight running and the turning performance on a wet road were evaluated. The results of the evaluation are illustrated in Table 1.

(1) Present Invention Tire I

The tread pattern is the one shown in FIG. 1. The position of the main groove 2 is the same as that of the tire equator line A, with the main grooves $2_1$ being situated at a position which is away from the tire equator line A in the width-wise direction of the tire by a distance equal to 15% of the tire ground-contacting width T, and the main groove $2_2$ at a position which is away from the tire equator line A in the width-wise direction of the tire by a distance equal to 25% of the tire ground-contacting width T.

(2) Present Invention Tire II

The tread pattern is the one shown in FIG. 2. The same construction is adopted except that the main grooves $2_1$, $2_1$ are situated at a position which is away from the tire equator line A in the width-wise direction of the tire by a distance equal to 20% of the tire ground-contacting width T.

(3) Prior Art Tire I

Figure 3:
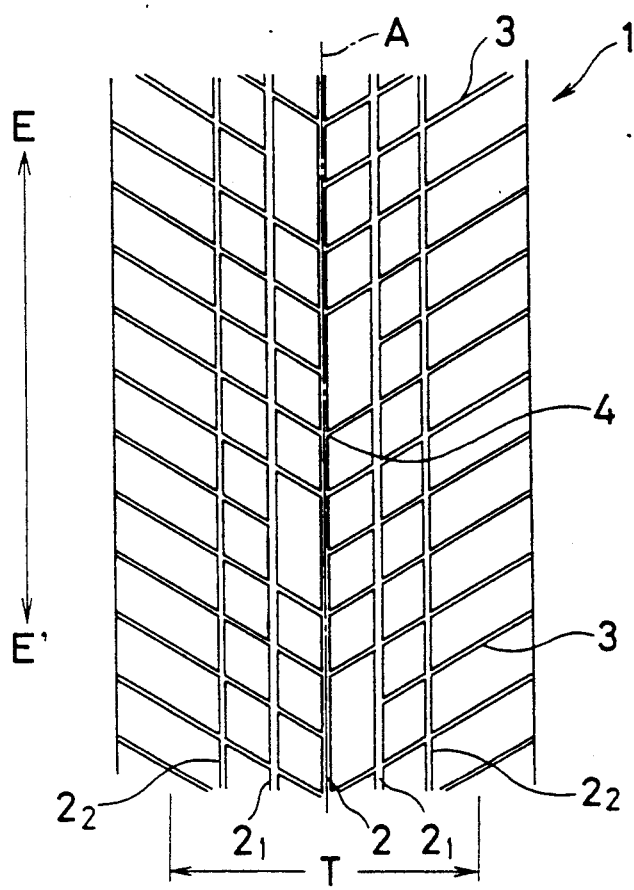
FIGS. 3 and 4 are plan views partly showing tread patterns for a pneumatic tire according to the prior art.

The tread pattern is the one shown in Fig. 3. In FIG. 3, all the V-shaped bending points 4 of the sub-grooves 3 are disposed on the tire equator line A. In order to make the groove area ratio in the tread 1 of the tire thereof identical with that of Present Invention Tire I, the sub-grooves 3 are partially made discontinuous at the central area of the tread of the tire in the width-wise direction thereof the position of the main groove 2, $2_1$, $2_2$ is the same as that of Present Invention Tire 1. The other structures of the tire are the same as those of Present Invention Tire I.

(4) Prior Art Tire II

Figure 4:
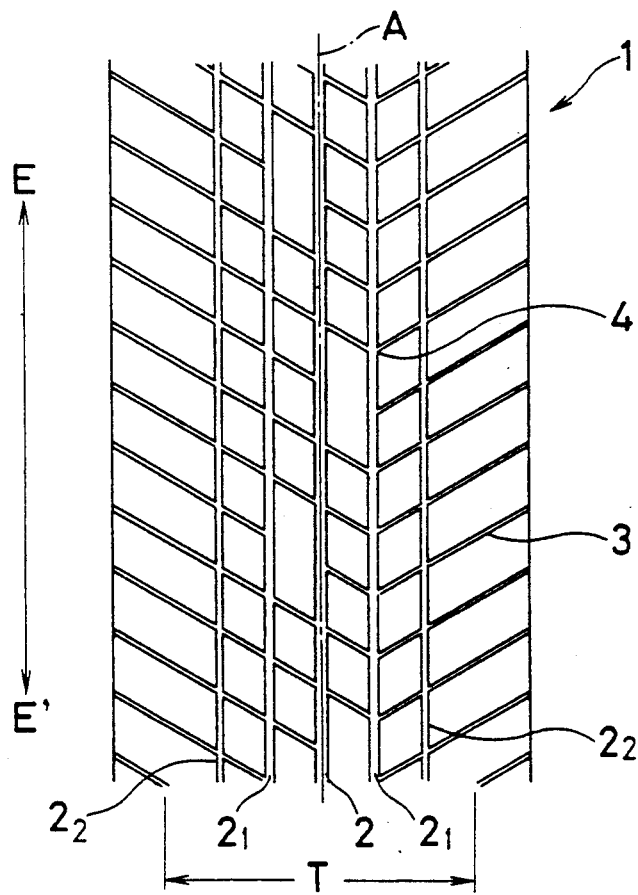

The tread pattern is the one shown in FIG. 4. In FIG. 4, the bending points 4 of the sub-grooves 3 are deviated and are disposed at the position of the groove $2_1$ that is positioned outwardly of the tire equator line A when fitted on an automobile (the groove $2_1$ positioned on the outer side of an automobile relative to the tire equator line A at a reference, when a tire is fitted on the automobile). In order to make the groove area ratio in the tread 1 of the tire thereof identical with that of Present Invention Tire I, the sub-grooves 3 are partially made discontinuous at the central area of the tread 1 of the tire in the width-wise direction thereof. The position of the main groove 2, $2_1$, $2_2$ is the same as that of Present Invention Tire 1. The other structures of the tire are the same as those of Present Invention Tire I.

(5) Prior Art Tire III

When a tire similar to Prior Art Tire II is fitted on an automobile, the tire is fitted inside out.

Method of Evaluating Hydroplaning Performance for Straight Running

The tires to be evaluated were fitted on automobiles, and the critical speed at which hydroplaning would take place was measured when the automobiles were driven into an area of a road on which water is provided to a certain depth (5 mm in average). The results were expressed by an index. Greater values show the better results. The tires to be evaluated were fitted on automobiles in such a manner that the distal end of the bending point 4 of the sub-groove 3 faces the running direction of the automobiles when viewed from thereabove.

Method of Evaluating Turning Performance on Wet Road

The tires to be evaluated were fitted on automobiles, and the critical speed was measured when the automobiles were turned in a circle with a certain radius (30m) on a road on which water is provided to a certain depth (5 mm in average). Then, the lateral force G was calculated from values so measured, and the results were expressed by an index. Greater values show the better results. The tires to be evaluated were fitted on automobiles in such a manner that the distal end of the bending point 4 of the sub-groove 3 faces the running direction of the automobiles as viewed from thereabove.

TABLE 1

| | Hydroplaning Performance for straight running | Turning performance on wet road | Number of types of molds used to produce tires |
|---|---|---|---|
| Prior Art Tire I | 100 | 100 | 1 |
| Present Invention Tire I | 100 | 103 | 1 |
| Present Invention Tire II | 100 | 102 | 1 |
| Prior Art Tire II | 100 | 105 | 2 |
| Prior Art Tire III | 100 | 98 | 2 |

It is clear from the above Table 1 that Present Invention Tires I and II are superior to Prior Art Tire I in the turning performance on a wet road without sacrificing the hydroplaning performance for straight running. In contrast Prior Art Tire II is advantageous in the turning performance on a wet road, but is disadvantageous in that two types of molds are required to produce tires for particular fitting positions. Prior Art Tire III is disadvantageous not only in the turning performance on a wet road but also in that two types of molds are required to produce tires for particular fitting positions.

Furthermore, it was confirmed from the results of Prior Art Tires II and III that the influence of the tires having a tread pattern that is laterally unsymmetrical upon the turning performance on a wet road greatly varies according to how the tires are fitted to the automobiles.

As is explained above, according to the present invention, a plurality of sub-grooves are individually bent in a convex shape facing in the same direction relative to the circumferential direction of the tire, and the bending points of the sub-grooves are disposed within two left and right areas which extend, respectively, from a tire equator line A toward opposite sides of the tire in the width-wise direction thereof oven a distance equal to 5 to 25% of the tread ground-contacting width, and are distributed such that the number of the bending points become substantially equal on either side of the tire equator line. Due to this structure, the following advantages take effect.

(1) The drain properties at the time of turning can be improved without sacrificing the drain properties at the time of straight running irrespective of the fact that tires having the tread patterns of the present invention are used either on the left- or right-hand side of an automobile.

(2) Since the tread patterns are laterally symmetrical relative to the tire equator line, one type a mold of only is required to produce tires, which is advantageous from the production point of view.

(3) In a case where the main groove is placed on the tire equator line, as shown in FIG. 1, the main groove 2 and the sub-grooves 3 intersect each other near the tire equator line, which allows water from the sub-grooves 3 to flow into the main groove 2 at intersecting points 5.

Thus, the deterioration of the drain properties for straight running is prevented, thereby making it possible to improve the braking properties of a tire at the time of straight running on a wet road.

What is claimed is:

1. A pneumatic tire wherein a plurality of main grooves are provided in a tread of said tire so as to circumferentially fully extend therearound with a plurality of sub-grooves connecting said main grooves with each other being provided in the width-wise direction of said tire, wherein each of said sub-grooves is bent in a convex shape facing in the same direction relative to the circumferential direction of said tire; wherein bending points of said sub-grooves are distributed within those areas in the tread of said tire which extend, respectively, from said tire equator line toward opposite sides of said tire in the width-wise direction thereof over a distance equal to 5 to 25% of the tread ground-contacting width in such a manner that the number of said bending points is substantially equal on both sides of said tire equator line; and wherein in the plurality of sub-grooves, the sub-grooves are continuous across the width of the tire and each sub-groove is bent only once across the tread width.

2. A pneumatic tire as set forth in claim 1, wherein said bending points of said sub-grooves are alternately disposed on either side of said tire equator line along the circumferential direction of said tire.

3. A pneumatic tire as set forth in claim 1, wherein one or more of said plurality of main grooves are disposed within said respective areas in the tread of said tire, and wherein said bending points of said sub-grooves are situated on any one of said main grooves in said respective areas.

4. A pneumatic tire as set forth in claim 1, wherein the shape of said bending points of said sub-grooves when viewed from thereabove is substantially a V-shape.

5. A pneumatic tire as set forth in claim 1, wherein the shape of said bending points of said sub-grooves when viewed from thereabove is a shape whose bending distal end is curved.

6. A pneumatic tire wherein a plurality of main grooves are provided in a tread of said tire so as to circumferentially fully extend therearound and one of said plurality of main grooves is situated on a tire equator line, with a plurality of sub-grooves connecting said main grooves with each other being provided in the width-wise direction of said tire, wherein each of said sub-grooves is bent in a convex shape facing in the same direction relative to the circumferential direction of said tire and has a bending point; and wherein bending points of some of said sub-grooves are distributed within those areas in the tread of said tire which extend, respectively, from said tire equator line toward opposite sides of said tire in the width-wise direction thereof over a distance equal to 5 to 25% of the tread ground-contacting width in such a manner that the number of said bending points is substantially equal on both sides of said tire equator line and wherein the remainder of said bending points of said sub-grooves are situated on said main groove so situated on said tire equator line.

* * * * *